(12) United States Patent
Carteau

(10) Patent No.: US 6,292,360 B1
(45) Date of Patent: Sep. 18, 2001

(54) PACKAGING SYSTEM FOR MASS MEMORY UNITS HAVING UNIFORM OR MIXED FORM FACTORS

(75) Inventor: Daniel Carteau, Phoenix, AZ (US)

(73) Assignee: Bull HN Information Systems Inc., Bialerica, MA (US)

(*) Notice: Subject to any disclaimer, the term of this patent is extended or adjusted under 35 U.S.C. 154(b) by 0 days.

(21) Appl. No.: 09/594,942

(22) Filed: Jun. 15, 2000

(51) Int. Cl.$^7$ ........................................ G06F 1/16
(52) U.S. Cl. .................. 361/685; 361/679; 361/683; 361/684; 361/685; 361/686
(58) Field of Search ................................. 361/679, 683, 361/684, 685, 686

(56) References Cited

U.S. PATENT DOCUMENTS

| | | | |
|---|---|---|---|
| 6,188,571 | * | 2/2001 | Roganti et al. ................... 361/685 |
| 6,201,692 | * | 3/2001 | Gamble et al. ................... 361/685 |

* cited by examiner

*Primary Examiner*—Leo P. Picard
*Assistant Examiner*—Yean-Hsi Chang
(74) *Attorney, Agent, or Firm*—B. E. Hayden; J. H. Phillips; J. S. Solakian

(57) ABSTRACT

In order to obtain mixed and space efficient use of mass memory units having different form factors into a single package, a specially configured connector plane module is provided. The connector plane module includes three identical, aligned, connector plane connectors arranged in a new configuration. Two spaced apart connector plane connectors are disposed in the same orientation with one another; but the third connector plane connector is spaced apart from and disposed in 180° orientation with respect to the second connector. With this configurtion, two mass memory storage units having a first form factor or three mass memory storage units of a second, smaller, form factor may be coupled to the connector plane to occupy substantially the same space, one mass memory unit in each case being oriented at 180° with respect to the one or two other mass memory units.

12 Claims, 5 Drawing Sheets

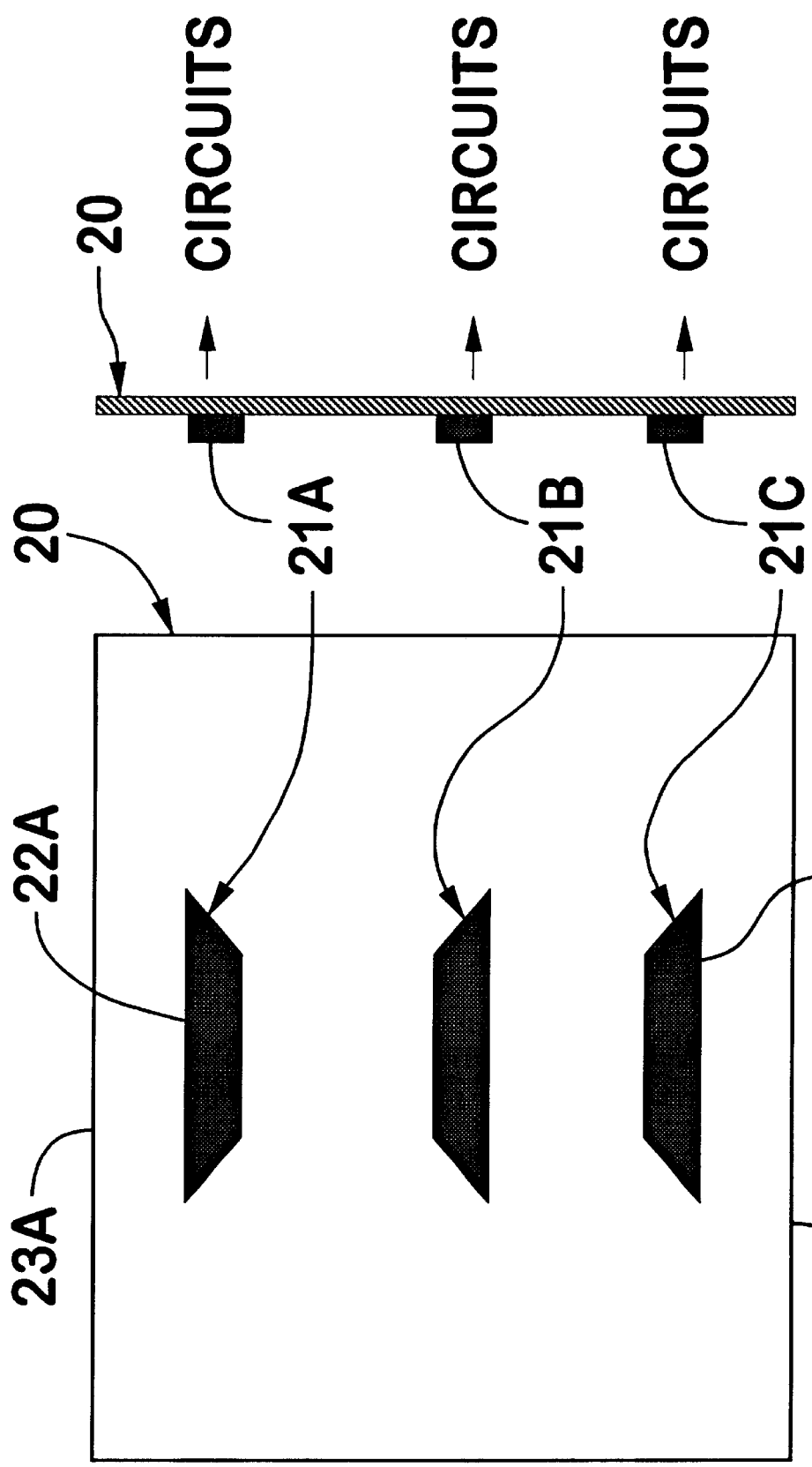

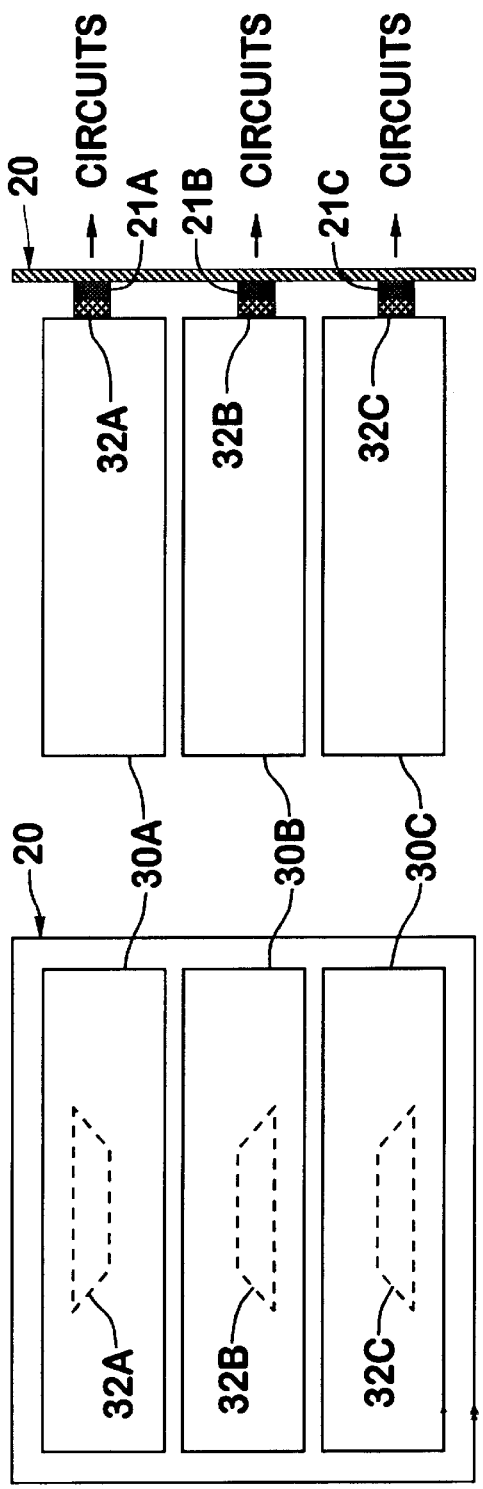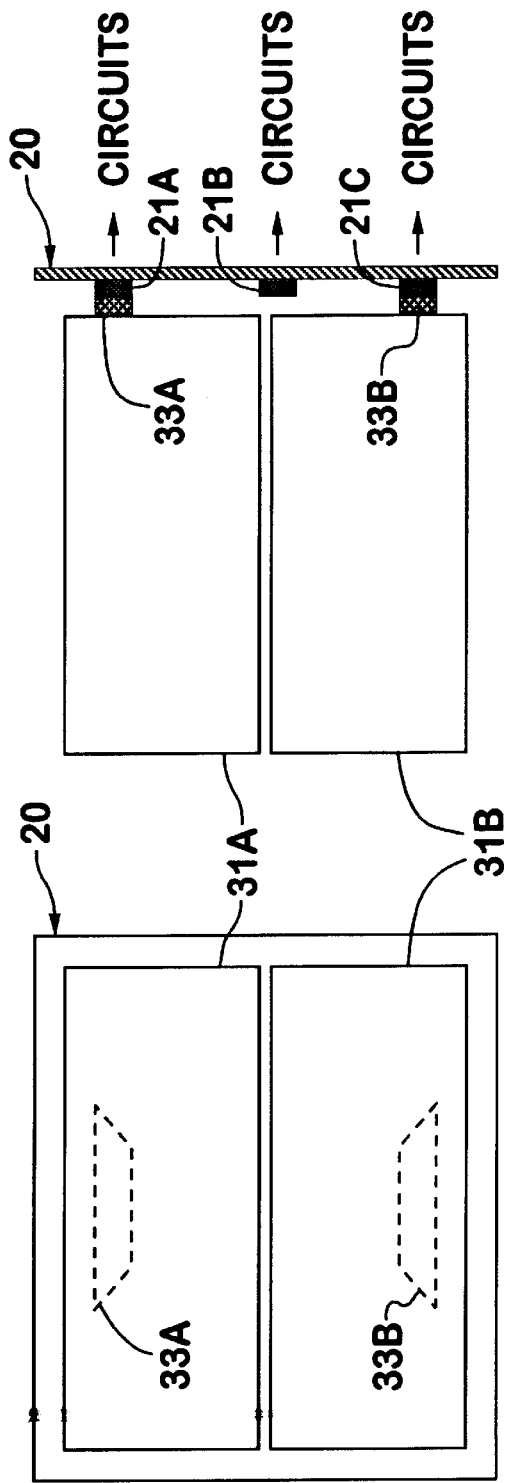

PACKAGING SYSTEM FOR MASS MEMORY UNITS HAVING UNIFORM OR MIXED FORM FACTORS

FIELD OF THE INVENTION

This invention relates to the efficient packaging of mass memory units (such as hard disk drive arrays) having uniform or mixed form factors.

BACKGROUND OF THE INVENTION

Large scale computer systems incorporate banks of mass storage units such as arrays of hard disk drives. Hard disk drive units currently available for this application typically employ 3.5 inch drives configured into one of two "height" form factors: one inch and 1.6 inch. Each disk drive is about four inches in "width". The height and width dimensions are stated for industry categorization purposes only because the disk drives will operate in any orientation and are often arranged with the "height" dimension disposed horizontally; for example, in conventional nineteen inch rack mounts.

At the state of the art, the performance characteristics of 1.0 inch and 1.6 inch form factor disk drives may be summarized as follows:

The 1.6 inch disk drives generally have higher capacity and offer lower cost per unit of storage provided (i.e., cost per megabyte).

On the other hand, the one inch disk drives generally are less costly per disk drive and offer higher performance.

Disk drives in servers or disk subsystems are usually packaged in canisters which permit L ion of the disk drives including the support of hot plug/unplug functions. The canisters each have a connector adapted to engage a complementarily configured connector on a backplane which includes printed circuit traces conventionally interfacing with system circuitry. The position and orientation of a canister connector is typically established by an industry standard for the type of mass memory unit employed. Thus, because the mechanical dimensions of the disk drive caters and the electrical and mechanical interfaces are well defined into a respected standard, a ready interchange of canisters may be carried out.

It is common practice to include disk drive canisters in each of the one inch and 1.6 inch form fax in a given system to achieve an optimization of performance and storage capacity for the application. In the prior art, this has been achieved by adopting an electrical and mechanical design which directly supports the 1.6 inch disk drive canisters and which also accommodates the one inch disk drive in the same canisters. With this approach, however, the one inch disk drive canisters occupy the same "height" dimension as the 1.6 inch disk drive canisters. This approach is very easy to put into practice, but completely fails to allow the achievement of optimum space usage, and this is a significant drawback.

Of course, two different designs accommodating, respectively, a row (for example, in a standard nineteen inch rack mount) of one inch canisters and a row of 1.6 inch canisters can be provided, but this approach does not permit optimally mixing one inch and 1.6 inch canisters in a given row, and the advantage of the use of a single backplane and mechanical design is lost.

OBJECTS OF THE INVENTION

It is therefore a broad object of this invention to provide a mass memory packaging system in which mass memory units (e.g., disk drives) having first and second form factors can be mixed in a compact assembly.

It is a more specific object of this invention to provide such a mass memory packaging system in which canisters containing mass memory units are plugged into a backplane on which backplane connectors are disposed on modules carrying three backplane connectors each with the outer two connectors mutually oriented at 180°.

In another aspect, it is an object of this invention to provide a mass memory packaging system requiring only a single backplane module configuration to accommodate mass memory units having two different form factors, thereby eliminating the necessity for designing more than one such packaging system.

SUMMARY OF THE INVENTION

Briefly, these and other objects of the invention are achieved by a mass memory which includes a backplane (or other connector plane) module having three identical, aligned, backplane connectors arranged in a new configuration Two spaced apart backplane connectors are disposed in the same orientation with one another, but the third backplane connector is spaced apart from and disposed in 180°0 orientation with respect to the second connector. With this configuration, two mass memory storage units having a first form factor or three mass memory storage units of a second, smaller, form factor may be coupled to the backplane to occupy substantially the same space, one mass memory unit in each case being oriented at 180°0 with respect to the one or two other mass memory units.

DESCRIPTION OF THE DRAWINGS

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 9 is a plane view of a backplane module according to the present invention;

FIG. 10 is a side view of the backplane shown in FIG. 9;

FIG. 11 is a plan view illustrating three one inch form factor disk drive canisters engaged with a backplane according to the present invention;

FIG. 12 is a side view of the backplane and canisters shown in FIG. 11;

FIG. 13 is a plan view illustrating two 1.6 inch form factor disk drive canisters engaged with a backplane according to the present invention;

FIG. 14 is a side view of the backplane and canisters shown in FIG. 13;

DESCRIPTION OF THE PREFERRED EMBODIMENT(s)

Figure 1:
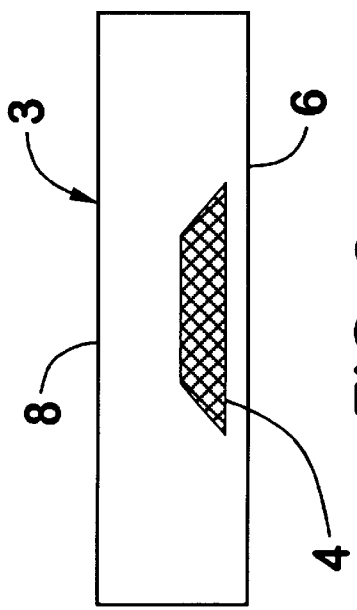
FIG. 1 is a connector end view of an exemplary 1.6 inch form factor disk drive canister shown in a simplified representation.
Figure 3:
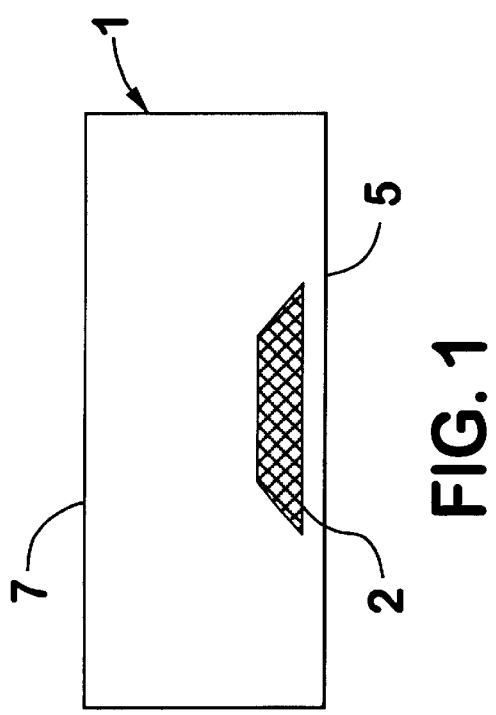
FIG. 3 is a side view of the canister shown in FIG. 1.

Attention is first directed to FIGS. 1 and 3 which illustrates an exemplary 1.6 inch form factor disk drive canister 1 (shown in a simplified representation) in end and side views, resively. An integral connector 2 is disposed to mate with a complementarily configured connector on a backplane (as will be discussed further below) in order to electrically couple the disk drive canister into a server, disk drive subsystem or other mass storage subsystem in the well known manner.

Figure 2:
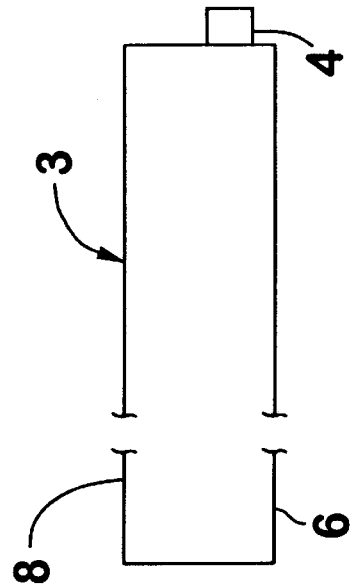
FIG. 2 is a view similar to FIG. 1 of an exemplary one inch form factor disk drive canister.
Figure 4:
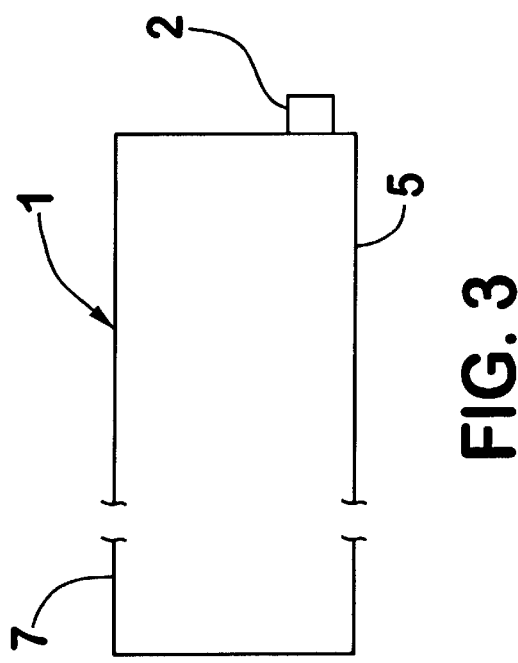
FIG. 4 is a side view of the canister shown in FIG. 2.

Similarly, FIGS. 2 and 4 the an exemplary one inch form factor disk drive canister 3 in end and side views, respectively with an integral connector 4 disposed to mate with a complimentarily configured connector on a backplane.

It will be observed that the positions of the connectors 2 and 4 with respect to the bottoms of the canisters 1, 3, respectively is substantially the same; i.e., in the examples, each connector is centrally positioned across the width dimension and disposed about the same distance above the bottoms 5, 6, respectively of the canisters. The precise positions and configurations used with various types and subtypes of mass memory units is typically well established to recognized standards, and this characteristic is used to advantage in the invention as will become evident below. Presently contemplated interface standards for mass memory units with which the invention may be used to advantage include: Fiber Channel Arbitrated Loop (FC-AL), SCSI, SSA, ATA, etc. Of course, future mass memory units with new interface standards may also be susceptible to advantageous use with the invention.

Accordingly, it will be understood that the positions of the connectors 2, 4 shown in FIGS. 1–4 are exemplary only; however, in accordance with the invention, the positions of the connectors 2, 4 should be substantially the same (typically centrally disposed) across the width of the canisters 1, 3 and more closely positioned to the canister bottoms 5, 6 than to the respective canisters tops 7, 8 (or vice versa). Those skilled in the art will appreciate that the connectors are keyed, as represented by the trapezoidal shape shown, in order to prevent inadvertently connecting a canister to the backplane upside down. Other keying methods are well known the art, and the rails (not shown) used to position and support a mass memory unit also serve to prevent incorrect insertion. If mass memory units fabricated to industry standards are used in the practice of the invention, the possibility of incorrect insertion is essentially precluded.

Figure 7:
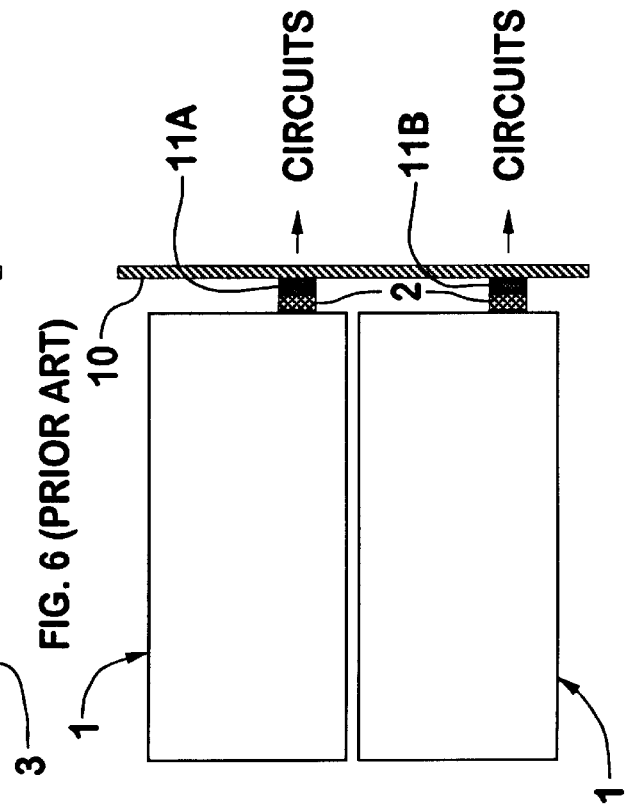
FIG. 7 shows a pair of 1.6 inch form actor disk drive canisters plugged into a backplane module according to the prior art.
Figure 8:
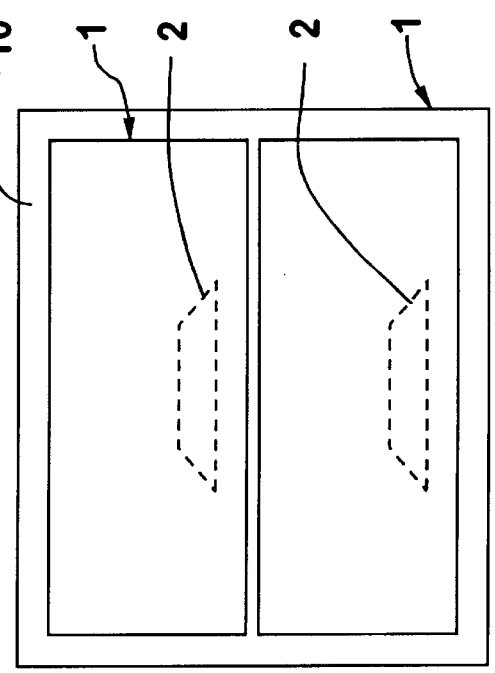
FIG. 8 is a side view of the canisters and backplane shown in FIG. 7.

Attention is now directed to FIGS. 5–8 which illustrate exemplary prior art configurations for accommodating a plurality of hard disk canisters in a server, disk drive subsystem or the like. A backplane module 10, in the example, is provided with backplane connectors 11A, 11B spaced apart to engage two 1.6 inch disk drive canisters 1 in a closely spaced configuration as best shown in FIGS. 7 and 8. Thus, the canister connectors 2 carried by the canisters 1 conventionally engage the backplane connectors 11A, 11B which are integrated into the backplane 10 for electrical coupling to conventional circuits (not shown) which interface with the rest of the information processing system.

Figure 5:
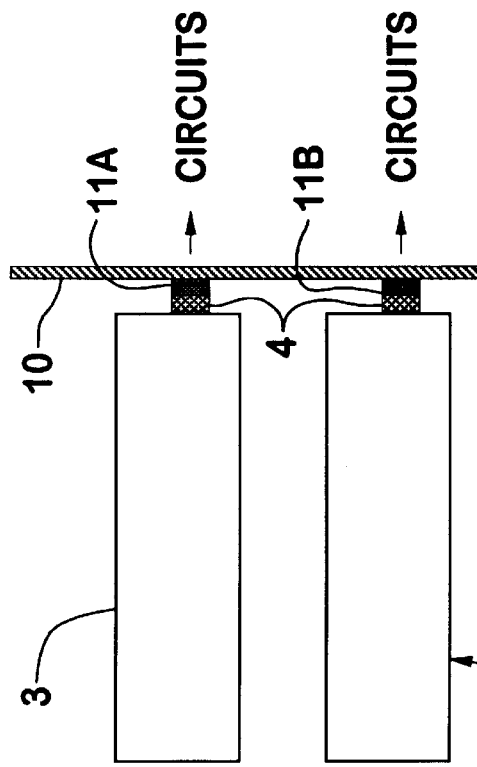
FIG. 5 shows a pair of one inch form actor disk drive canisters plugged into a backplane module according to the prior art.
Figure 6:
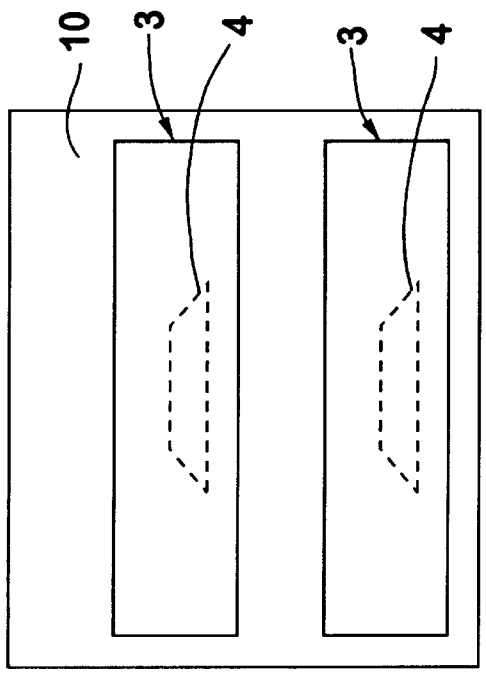
FIG. 6 is a side view of the canisters and backplane shown in FIG. 5.

However, if the use of one inch disk drive canisters 3 is selected as shown in FIGS. 5 and 6, only two disk drive canisters 3 can be mated with the backplane 10 by engaging connectors 4 with backplane connectors 11A, 11B. As a result, packing density is not optimum because there is physical room for three, rather than two, one inch disk drive canisters in the space which can be occupied by two 1.6 inch disk drive canisters, but there is no provision for electrically coupling three one inch disk drive canisters into the system.

This problem is solved, in accordance with the invention, by the adoption of a specially configured backplane module 20, an embodiment of which is illustrated in FIGS. 9 and 10. In this exemplary embodiment, the backplane module 20 incorporates three backplane connectors 21A, 21B, 21C emplaced in a new. The center connector 21B and one of the outer connectors, 21C in the example, are oriented identically; however, the other outer connector, 21A in the example, is inverted 180° with respect to the connectors 21B, 21C. In addition, the first outer connector 21A is situated with its outer (upper in the illusion) edge 22A placed at substantially the same distance from a first outer (upper in the illustration) edge 23A of the backplane module 20 as the outer edge 22C of the second outer connector 21C is situated from the second outer (lower in the illustration) edge 23C of the backplane module. Accordingly, it will be understood that a canister plugged into backplane at the top position must be inverted (as oriented in FIGS. 9 and 10) with respect to a canister canisters plugged into either or both of the intermediate and lower positions whether it has a form factor of one inch or 1.6 inch. Disk drives are mannered so that inverted operation is permissible without compromising performance or reliability, and the present invention takes advantage of that fact.

Consider now the benefits obtained by the use of the backplane module 20 with reference to FIGS. 11–18. These FIGS. show that two 1.6 inch disk drive modules or three one inch modules may be fitted into substantially the same space. More particularly, FIGS. 11 and 12 illustrate three one inch disk drive canisters 30A, 30B, 30C plugged into the backplane module 30. While the canisters 30B, 30C are oriented in the same manner (i.e., "top side up") to permit correct electrical and physical engagement of the connectors 32B, 21B and 32C, 21C, the canister 30A is inverted 180° (i.e., "top side down") to permit correct engagement of the connectors 32A, 21A.

Similarly, FIGS. 13 and 14 illustrated two 1.6 inch disk drive canisters 31A, 31B plugged into the backplane module 30. While the canisters 31B is oriented "top side up" to correctly couple the connectors 33B, 21C, the canister 31A is inverted 180° (i.e., "top side down") with respect to the cannister 31B in order to correctly couple the connectors 33A, 21A. It will be noted that the backplane connector 21B is not used with the two 1.6 inch canisters 31A, 31B. Thus, it will now be understood that, in arrordance with the invention, three one inch disk drive canisters or two 1.6 inch disk drive canisters can be disposed in substantially the same space to effect a compact and optimally packed package.

While the positions of the backplane module connectors 21A, 21B, 21C shown in FIGS. 9 and 10 have been described above with respect to peripheral edges of the backplane module 20, it will be understood that this is not a limitation to the practice of the invention although it does provide a compact backplane module. However, the basis for establishing the correct spacing between the backplane connectors for a given application is the difference between the form factors of the two types of mass storage units employed in that application. After two different form factor mass storage units have been selected for the given application, the positions of the connectors (with the two outboard connectors oriented 180° with respect to one another) are readily determinable to provide the desired distribution which accommodates two large and three small mass storage units in substantially the same space.

Figure 15:
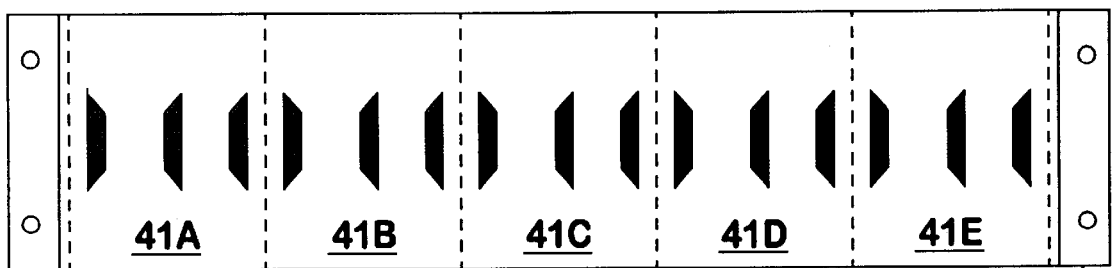
FIG. 15 is a front view of a standard nineteen inch rack mount incorporating five backplane modules according to the present invention.

FIGS. 15–18 show an illustrative practical disk drive subsystem or disk drive subsystem component. As best shown in FIG. 15, a standard nineteen inch rack mount 40 incorporates five backplane modules 41A, 41B, 41C, 41D, 41E according to the invention. The backplane modules are rotated 90° from the position shown in FIG. 9 and are aligned and abutted edge-to-edge in order to effect an elongated backplane having fifteen connectors.

Figure 16:
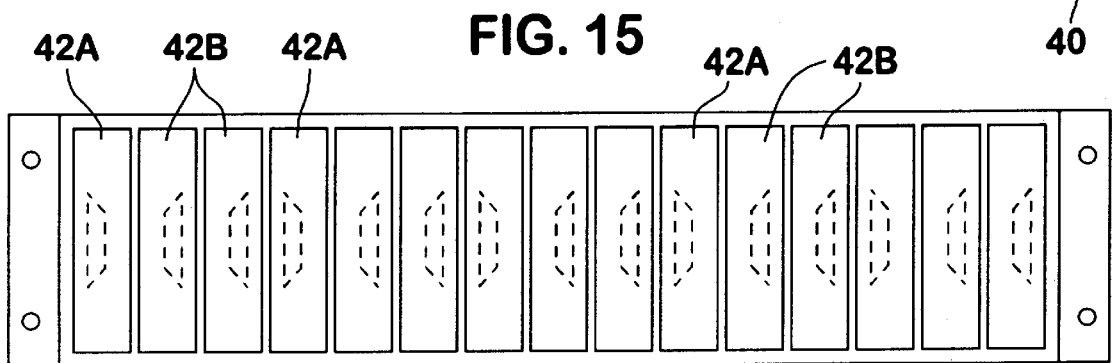
FIG. 16 illustrates fifteen one inch form factor disk drive canisters plugged into the rack mount shown in FIG. 15.

In FIG. 16, an array of fifteen one inch disk drive form factor canisters 42A, 42B are shown plugged into the rack mount 40. It will be observed that that the five canisters 42A are oriented 180° with respect to the ten canisters 42B to permit correct engagement of the canister connectors with the backplane connectors (refer also to FIG. 12).

Figure 17:
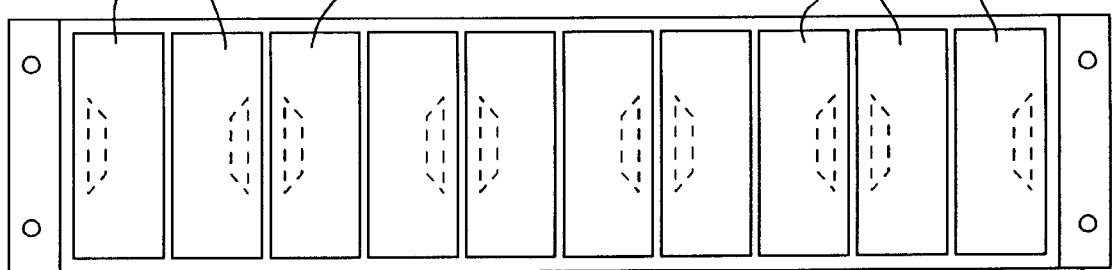
FIG. 17 illustrates ten 1.6 inch form factor disk drive canisters plugged into the rack mount shown in FIG. 15.

Similarly, FIG. 17 shows an array of ten 1.6 inch disk drive form factor canisters 43A, 43B plugged into the rack mount 40. The five canisters 43A are oriented 180° with respect to the five canisters 43B to permit correct engagement of the canister connectors with the backplane connectors (refer also to FIG. 14).

Figure 18:
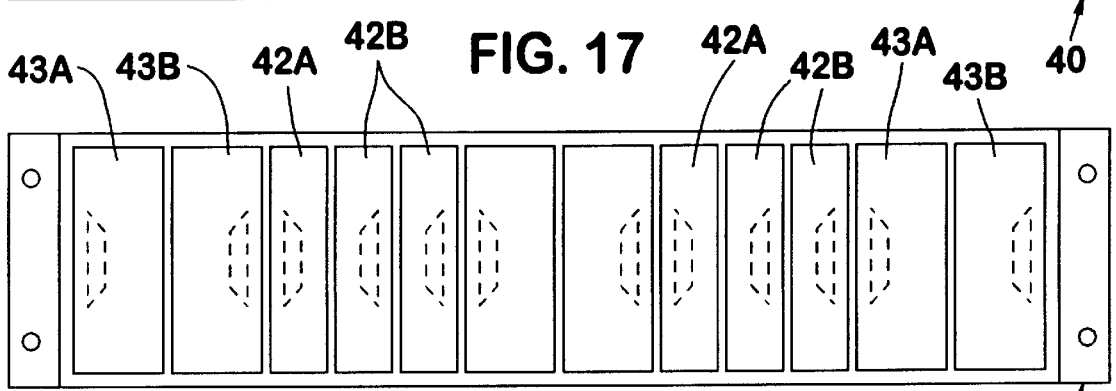
FIG. 18 illustrates an exemplary mix of one and 1.6 inch form factor disk drive canisters plugged into the rack mount shown in FIG. 15 and particularly showing the advantages of the invention in optimally packing the disk drive canisters having two different form factors into a single rack mount.

Finally, FIG. 18 illustrates an exemplary configuration in which a mix of six one inch 42A, 42B and six 1.6 inch canisters 43A, 43B are plugged into the rack mount 40. More particularly, from left to right, there are arranged two 1.6 inch canisters, three one inch canisters, two 1.6 inch canisters, three one inch canisters and two 1.6 inch canisters. It will be observed that, in contrast to the prior art as previously discussed, the twelve canisters 42A, 42B, 43A, 43B are all closely spaced to achieve an efficient and compact assemblage of different form factor disk drives.

Referring again to FIG. 15, those killed in the art will appreciate that the backplane modules 41A, 41B, 41C, 41D, 41E can by integrated into a unitary structure with the backplane connectors correctly spaced according to the invention. The invention, of course, is not limited to use in standard nineteen inch rack mounts, but rather may be employed in any backplane using one or more backplane modules according to the invention, which backplane modules may be individual, plural or a plurality integrated into an extended, unitary backplane.

Further, it is again noted that, while disk drives of two different form factors have been used to explain the invention, the invention is not limited to the use of disk drives. Other mass storage devices, such as compact disk drives, tape cassette drives, optical storage devices, etc. are or may become available in different, similarly proportioned, form factors, and the invention may be used to the same advantage with such diverse mass storage devices.

While the term "backplane" has been used to describe the invention, those skilled in the art will appreciate that, depending on the position of the component, the term "midplane" or another term may be appropriate. For convenience in terminology, the generic term "connector plane" may be deemed to include backplanes, midplanes and the like.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A mass memory including:
   A) a backplane module comprising:
      1) three identical backlane connectors arranged in the following planner:
         a) first and second spaced apart backplane connectors disposed in the sane orientation and aligned with one another; and
         b) a third backplane connector spaced apart from said second backplane connector and disposed in 180° orientation with respect thereto and aligned therewith; and
   B) a plurality of mass storage units each including a integral connector complementarily configured to mechanically couple with one of said backplane connectors to effect electrical connection to said backplane module.

2. The mass memory of claim 1 in which said integral connector of a first one of said plurality of mass storage units is mechanically coupled with said first backplane connector and a third one of said plurality of mass storage units is coupled with said third backplane connector such that said first and third mass storage units are oriented 180° with respect to one another.

3. The mass memory of claim 1 in which said integral connector of a first one of said plurality of mass storage units is mechanically coupled with said first backplane connector, said integral connector of a second one of said plurality of mass storage units is mechanically coupled with said second backplane connector, and said integral connector of a third one of said plurality of mass storage units is coupled with said third backplane connector such that: said first and second mass storage units are disposed in the same orientation and said first and third mass storage units are oriented 180° with respect to one another.

4. The mass memory of claim 1 which includes a plurality of said backplane modules disposed in alignment.

5. The mass memory of claim 4 in which, with respect to each of said plurality of said backplane modules, said integral connector of a first one of said plurality of mass storage units is mechanically coupled with said first backplane connector and a third one of said plurality of a mass storage units is coupled with said third backplane connector such that said first and third mass storage units are oriented 180° with respect to one another.

6. The mass memory of claim 4 in which, with respect to each of said plurality of said backplane modules, said integral connector of a first one of said plurality of mass storage units is mechanically coupled with said first backplane connector, said integral connector of a second one of said plurality of mass storage units is mechanically coupled with said second backplane connector, and said integral connector of a third one of said plurality of mass storage units is coupled with said third backplane connector such that: said first and second mass storage units are disposed in the same orientation and said first and third mass storage units are oriented 180° with respect to one another.

7. The mass memory of claim 4 in which:
A) with respect at least a first one of said plurality of said backplane modules, said integral connector of a first one of said plurality of mass storage units is mechanically coupled with said first backplane connector and a third one of said plurality of mass storage units is coupled with said third backplane connector such that said first and third mass storage units are oriented 180° with respect to one another; and
B) with respect to at least a second one of said plurality of said backplane modules, said integral connector of a fourth one of said plurality of mass storage units is mechanically coupled with said first backplane connector, said integral connector of a second one of said plurality of mass storage units is mechanically coupled with said second backplane connector, and said integral connector of a third one of said plurality of mass storage units is coupled with said third backplane connector such that said first and second mass storage units are disposed in the same orientation and said first and third mass storage units are oriented 180° with respect to one another.

8. The mass memory of claim 4 in which said plurality of backplane modules are integrated.

9. The mass memory of claim 5 in which said plurality of backplane modules are integrated.

10. The mass memory of claim 6 in which said plurality of backplane modules are integrated.

11. The mass memory of claim 7 in which said plurality of backplane modules are integrated.

12. A mass memory including:
A) a backplane module comprising:
  1) three identical backplane connectors arranged in the following manner:
    a) first and second spaced apart backplane connectors disposed in the same orientation and aligned with one another; and
    b) a third backplane connector spaced apart from said second backplane connector and disposed in 180° orientation with respect thereto and aligned therewith; and
B) a plurality of mass storage units each including a integral connector complementarily configured to mechanically couple with one of said backplane connectors to effect electrical connection to said backplane module;
the spacing between said first and second backplane connectors and between said second and third backplane connectors being selected such that, alternatively, first and second mass storage units having a first form factor and third, fourth and fifth mass storage units having a second form factor which is smaller than said first form factor occupy substantially the same space when, alternatively, said first and second mass storage units are coupled to said backplane module and said third, fourth and fifth mass storage units are coupled to said backplane module.

* * * * *